United States Patent
Obrecht et al.

(10) Patent No.: US 6,579,945 B2
(45) Date of Patent: Jun. 17, 2003

(54) GEL-CONTAINING RUBBER MIXTURES WITH INORGANIC PEROXIDES

(75) Inventors: Werner Obrecht, Moers (DE); Anthony Sumner, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/005,833

(22) Filed: Nov. 9, 2001

(65) Prior Publication Data
US 2002/0086944 A1 Jul. 4, 2002

(30) Foreign Application Priority Data
Nov. 14, 2000 (DE) .......................... 100 56 311

(51) Int. Cl.$^7$ ................................. C08F 8/00
(52) U.S. Cl. ...................................... 525/192
(58) Field of Search ................. 525/232, 240

(56) References Cited

U.S. PATENT DOCUMENTS

| | | | |
|---|---|---|---|
| 2,765,018 A | 10/1956 | Connell ........................ | 152/347 |
| 3,403,136 A | 9/1968 | Baker, Jr. .................... | 260/79.5 |
| 4,954,571 A * | 9/1990 | Iwamoto et al. ............. | 525/205 |
| 5,070,150 A | 12/1991 | Hopper ........................ | 525/350 |
| 5,095,068 A * | 3/1992 | Chiu ........................... | 524/525 |
| 5,124,408 A | 6/1992 | Engels et al. ................ | 525/215 |
| 5,157,081 A * | 10/1992 | Puydak et al. ............... | 525/237 |
| 5,395,891 A | 3/1995 | Obrecht et al. .............. | 525/194 |
| 6,057,397 A | 5/2000 | Takagishi et al. ........... | 524/492 |
| 6,127,488 A | 10/2000 | Obrecht et al. ............. | 525/333.3 |
| 6,207,757 B1 | 3/2001 | Obrecht et al. .............. | 525/194 |
| 6,252,008 B1 | 6/2001 | Scholl et al. ................ | 525/333.5 |

FOREIGN PATENT DOCUMENTS

| | | |
|---|---|---|
| CA | 2312171 | 12/2000 |
| CA | 2316421 | 2/2001 |
| DE | 197 01 487 A1 | 7/1998 |
| DE | 199 42 620 | 3/2001 |
| EP | 0 313 917 | 10/1988 |
| EP | 1 048 692 A2 | 11/2000 |
| GB | 966260 | 8/1964 |

OTHER PUBLICATIONS

Methoden Organischen Chemi 4$^{th}$ edition, Makromolekulare, Stoffe, Part 1–3, (month unavailable) 1987, pp. 1994–2024, e) chemisch modifizierte Polymere, Prof. Dr. Manfred L. Hallensleben.

* cited by examiner

Primary Examiner—Nathan M. Nutter
(74) Attorney, Agent, or Firm—Joseph C. Gil; Noland J. Cheung; Jennifer R. Seng

(57) ABSTRACT

The invention provides rubber mixtures of at least one double bond-containing rubber, rubber gels and additives of inorganic peroxides and also optionally further fillers and rubber auxiliary substances.

Rubber mixtures according to the present invention are characterized in the uncrosslinked state by good processability (compound viscosity ML 1+4/100° C.<60 ME) and in the vulcanized state by improved mechanical properties in particular with regard to the product of the modulus at 100% extension and the elongation at break ($S_{100}$×D) and also by improved tensile strengths. In addition, vulcanizates prepared from rubber mixtures according to the present invention have a relatively low density, which has an advantageous effect on the weight of the rubber molded items prepared from the rubber mixtures.

The vulcanizates are suitable for producing industrial rubber articles and for tire components.

10 Claims, No Drawings

GEL-CONTAINING RUBBER MIXTURES WITH INORGANIC PEROXIDES

FIELD OF THE INVENTION

The present invention provides rubber mixtures which contain crosslinked rubber particles (so-called rubber gels) and also metal peroxides in addition to the conventional mixture constituents, which are characterised in the uncrosslinked state by good processability (compound viscosity—ML 1+4/100(C.) and in the vulcanized state by improved mechanical properties in particular with regard to the product of the modulus at 100% extension and the elongation at break ($S_{100} \times D$) and also by improved tensile strengths. In addition, vulcanizates prepared from rubber mixtures according to the present invention have a relatively low density, which has an advantageous effect on the weight of the rubber molded items produced from the vulcanizates, in particular in the case of tires and tire parts.

BACKGROUND OF THE INVENTION

It is known that rubber mixtures of uncrosslinked rubbers and crosslinked rubber particles (rubber gels) have a low specific weight and low mixing viscosity and that vulcanizates are produced during vulcanization with conventional vulcanizing agents (e.g. sulfur vulcanization) which have a high rebound resilience at 70° C. and therefore, exhibit low damping under normal conditions of use.

In this connection, reference is made, for example, to U.S. Pat. Nos. 5,124,408, 5,395,891, DE-A 197 01 488.7, DE-A 197 01 487.9, DE-A 199 29 347.3, DE-A 199 39 865.8, DE-A 199 42 620.1 and DE-A 19701487.

For industrial use, the mechanical properties of gel-containing rubber vulcanizates are inadequate, in particular due to poor tear strengths and the defective reinforcing effects of microgels. In particular, an improvement in the product $S_{100} \times D$, modulus at 100% extension ($S_{100}$) and elongation at break (D), and in the tear strength (F) are required. These improvements should be achieved without causing any significant worsening of the advantageous mixture viscosities of the unvulcanized rubber mixtures.

The use of metal peroxides in combination with sulfur for crosslinking carboxyl group-containing rubbers such as e.g. carboxylated nitrile rubber is disclosed in U.S. Pat. No. 3,403,136. In this patent, the improvement in mechanical properties of gel-containing rubber compounds, however, is not disclosed.

From U.S. Pat. No. 2,765,018 it is known to react butyl rubber with inorganic peroxides. According to the disclosure in this patent, only incomplete vulcanization ("partially cured") is achieved. It cannot be gathered from this patent how the mechanical properties of fully crosslinked gel-containing rubber compounds can be improved.

According to EP-A 313 917, carboxyl group-free rubbers are vulcanized with vulcanizing systems which contain sulfur and peroxides of metals. The crosslinking of compounds which contain rubber particles is not disclosed.

Thus, there is an industrial-scale need to find measures to increase the general mechanical properties of gel-containing rubber vulcanizates, in particular the tear strength and the product of the modulus at 100% extension and the elongation at break ($S_{100} \times D$), wherein the compound viscosities of the unvulcanized mixtures are not significantly worsened by these measures.

SUMMARY OF THE INVENTION

Therefore the present invention provides rubber mixtures of at least one double bond-containing rubber (A), at least one rubber gel (B) and at least one metal peroxide (C), wherein the double bond-containing rubber (A) is present in amounts of 100 parts by wt., the rubber gel (B) is present in amounts of 10 to 150, preferably 20 to 120, parts by wt. and the peroxide (C) is present in amounts of 0.1 to 30, preferably 0.5 to 15, parts by wt.

DETAILED DESCRIPTION OF THE INVENTION

Rubber mixtures according to the present invention may obviously also contain known rubber fillers and rubber auxiliary substances as well as crosslinkers.

Constituent (A) in rubber mixtures according to the present invention are double bond-containing rubbers which are called R rubbers according to DIN/ISO 1629. These rubbers have a double bond in the main chain. The following, for example, are included among these:

| | |
|---|---|
| NR: | natural rubber |
| IR: | polyisoprene |
| SBR: | styrene/butadiene rubber |
| BR: | polybutadiene rubber |
| SIBR: | styrene/isoprene/butadiene rubber |
| NBR: | nitrile rubber |
| IIR: | butyl rubber |
| BIIR: | brominated isobutylene/isoprene copolymers with bromine contents of 0.1–10 wt. % |
| CIIR: | chlorinated isobutylene/isoprene copolymers with chlorine contents of 0.1–10 wt. % |
| HNBR: | hydrogenated or partially hydrogenated nitrile rubber |
| SNBR: | styrene/butadiene/acrylonitrile rubber |
| CR: | polychloroprene |
| ENR: | epoxidized natural rubbers or mixtures thereof |
| X-NBR: | carboxylated nitrile rubber |
| X-SBR: | carboxylated styrene/butadiene copolymers. |

NR, BR, SBR and SIBR are preferred.

However, double bond-containing rubbers are also understood to be those rubbers which are called M rubbers according to DIN/ISO 1629 and have, apart from a saturated main chain, double bonds in the side chains. EPDM, for example, is included here.

Double bond-containing rubbers of the types mentioned above to be used in rubber mixtures according to the present invention may obviously be modified by those functional groups which react with zinc peroxide and which enable improvement of the linkage of crosslinked rubber particles to the surrounding rubber matrix in the vulcanized state.

Preferred uncrosstinked rubbers are those which are functionalized by hydroxyl, carboxyl, amino, amide and/or epoxide groups. The introduction of functional groups may take place directly during polymerization, by copolymerization with suitable comonomers, or after polymerization by polymer modification.

The introduction of such functional groups by polymer modification is known and is described, for example, in M. L. Hallensleben "Chemisch modifizierte Polymere" in Houben-Weyl Methoden der Organischen Chemie, 4th edition, "Makromolekulare Stoffe", part 1–3; Georg Thieme Verlag Stuttgart, N.Y., 1987; p.1994–2024, DE-A 2 653 144, EP-A 464 478, EP-A 806 452 and DE-A 198 32 459.6.

The amount of functional groups in the rubbers is generally 0.05 to 25 wt. %, preferably 0.1 to 10 wt. %.

Constituent (B) in rubber mixtures according to the present invention are crosslinked rubber particles, so-called rubber gels or microgels, which are obtained by appropriate crosslinking of the following rubbers:

| | |
|---|---|
| NR: | natural rubber, |
| BR: | polybutadiene, |
| ABR: | butadiene/$C_{1-4}$ alkyl acrylate copolymers, |
| IR: | polyisoprene, |
| SBR: | styrene/butadiene copolymers with styrene contents of 1–60, preferably 5–50 wt. %, |
| SIBR: | styrene/isoprene/butadiene rubber, |
| X-SBR: | carboxylated styrene/butadiene copolymers, |
| FKM: | fluorinated rubbers, |
| ACM: | acrylate rubbers, |
| NBR: | polybutadiene/acrylonitrile copolymers with acrylonitrile contents of –60, preferably 10–50 wt. %, |
| X-NBR: | carboxylated nitrile rubbers, |
| ENR: | epoxidized natural rubber, |
| CR: | polychloroprene, |
| IIR: | isobutylene/isoprene copolymers with isoprene contents of 0.5–10 wt. %, |
| BIIR: | brominated isobutylene/isoprene copolymers with bromine contents of 0.1–10 wt. %, |
| CIIR: | chlorinated isobutylene/isoprene copolymers with chlorine contents of 0.1–10 wt. %, |
| HNBR: | partially and fully hydrogenated nitrile rubbers, |
| EPM: | ethylene/propylene copolymers, |
| EPDM: | ethylene/propylene/diene terpolymers, |
| EAM: | ethylene/acrylate copolymers, |
| EVM: | ethylene/vinylacetate copolymers, |
| CO and ECO: | epichlorhydrin rubbers, |
| Q: | silicone rubbers, |
| AU: | polyesterurethane polymers, |
| EU: | polyetherurethane polymers. |

BR, NR, SBR, NBR and CR are preferred.

Rubber particles to be used according to the present invention normally have particle diameters of 5 to 1000 nm, preferably 10 to 600 nm (data relating to diameter in accordance with DIN 53 206).

Due to the crosslinking, they are (almost) insoluble and are swellable in suitable precipitating agents, e.g. toluene. The (insoluble) gel fraction of the rubber particles generally amounts to 80 to 100 wt. %, preferably 90 to 100 wt. %. The swelling index of the rubber particles (Ql) in toluene is about 1 to 15, preferably 1 to 10.

The swelling index Ql is defined as:

$$Ql = \frac{\text{wet weight of toluene-containing gel}}{\text{dry weight of gel}}.$$

To determine the gel content and the swelling index, 250 mg of gel is swollen in 25 ml of toluene for 24 hours with shaking. The (insoluble) gel fraction is centrifuged off at 20,000 rpm and weighed (wet weight of toluene-containing gel) and then dried to constant weight at 70° C. and weighed again (dry weight of gel).

The preparation of crosslinked rubber particles (rubber gels) to be used from parent rubbers of the types mentioned above is known in principle and is described, for example, in U.S. Pat. No. 5,395,891 and EP-A 981 000 49.

In addition, it is possible to enlarge the particle size of the rubber particles by agglomeration. The preparation of silica/rubber hybrid gels by coagglomeration is also described, for example in DE-A 199 39 865.8.

Obviously, the crosslinked rubber particles, like the previously mentioned uncrosslinked double bond-containing rubbers, may also be modified by suitable functional groups which, as mentioned above, are able to react with zinc oxide and/or cause an improvement in the linkage of the rubber particles to the surrounding rubber matrix in the vulcanized state.

More preferably, modified crosslinked rubber particles which are modified by hydroxyl, carboxyl, amino, amido or by epoxide groups at the surface and which are present in the ranges of amounts mentioned above, are used in rubber mixtures according to the present invention The modification of crosslinked rubber particles (rubber gels) and the introduction of the previously mentioned functional groups are also known to a person skilled in the art and are described, for example, in DE-A 199 19 459.9, DE-A 199 29 347.3, DE-A 198 34 804.5.

Only modification of the corresponding rubbers or rubber gels in aqueous dispersion using appropriate polar monomers which enable the introduction of a hydroxyl, amino, amido, carboxyl and/or epoxide group is mentioned at this point.

Constituent (C) in the rubber mixtures are peroxides of metals from groups Ia, Ib, IIa and IIb of the Periodic System of Elements. Preferred metal peroxides are: sodium peroxide, calcium peroxide, barium peroxide and zinc peroxide, wherein zinc peroxide is particularly preferred. These peroxides may be used in the pure form or in a desensitized form. Conventional desensitizing agents are the oxides, hydroxides and carbonates of the corresponding metals. Commercial zinc peroxide from Riedel-de Haen contains, e.g. in addition to about 55 wt. % zinc peroxide, also additional zinc oxide and small amounts of zinc carbonate and zinc hydroxide.

Rubber mixtures according to the present invention may contain, in addition to mixture constituents (A), (B) and (C), also further fillers and/or rubber auxiliary substances and/or crosslinkers.

Particularly suitable fillers for preparing rubber mixtures and vulcanizates according to the present invention are e.g.:

Carbon blacks. The carbon blacks to be used here are prepared by the lamp black, furnace black or channel black process and have BET surface areas of 20–200 $m^2/g$ such as e.g.: SAF, ISAF, IISAF, HAF, FEF or GPF carbon blacks.

Silicas, prepared e.g. by precipitation of solutions of silicates or flame hydrolysis of silicon halides with specific surface areas of 5–1000, preferably 20–400 $m^2/g$ (BET surface area) and primary particle sizes of 5–400 nm. The silicas may also optionally be present as mixed oxides with other metal oxides such as Al, Mg, Ca, Ba, Zn and Ti oxides.

Synthetic silicates such as aluminum silicate, alkaline earth silicates, such as magnesium silicate or calcium silicate, with BET surface areas of 20–400 $m^2/g$ and primary particle diameters of 5–400 nm.

Natural silicates such as kaolin and other naturally occurring silicas.

Metal oxides such as zinc oxide, calcium oxide, magnesium oxide, aluminum oxide.

Metal carbonates such as calcium carbonate, magnesium carbonate, zinc carbonate.

Metal sulfates such as calcium sulfate, barium sulfate.

Metal hydroxides such as aluminum hydroxide and magnesium hydroxide.

Glass fibers and glass fiber products (laths, ropes or glass microbeads).

Thermoplastic fibers (polyamide, polyester, aramide).

Thermoplastic fillers such as polyethylene, polypropylene, polytetrafluoroethylene, syndiotactic 1,2-polybutadiene, trans-1,4-polybutadiene, syndiotactic polystyrene and polycarbonate.

Suitable rubber auxiliary substances are e.g.: reaction accelerators, antioxidants, heat stabilizers, light stabilizers, ozone stabilizers, processing auxiliary substances, plasticizers, tackifiers, blowing agents, colorants, pigments, waxes, resins, extenders, organic acids, delayers, metal oxides and filler activators such as, for example, triethanolamine, polyethylene glycol, hexanetriol and bis-(triethoxysilylpropyl)-tetrasulfide.

The rubber auxiliary substances are used in conventional amounts, which are governed, inter alia, by the intended application. Conventional amounts are e.g. amounts of 0.1–50 parts by wt., with respect to the amount of rubber (A) used.

Crosslinkers which may be used are sulfur, sulfur donors, peroxides or crosslinking agents such as, for example, diisopropenylbenzene, dinvinylbenzene, divinylether, divinylsulfone, diallyl phthalate, triallyl cyanurate, triallyl isocyanurate, 1,2-polybutadiene, N,N'-m-phenylenemaleic imide and/or triallyl trimellitate. In addition, suitable compounds are the acrylates and methacrylates of polyhydric, preferably 2 to 4-hydric, $C_2$ to $C_{10}$ alcohols such as ethylene glycol, propanediol-1,2-butanediol, hexanediol, polyethylene glycol with 2 to 20, preferably 2 to 8 oxyethylene units, neopentyl glycol, bisphenol-A, glycerine, trimethylolpropane, pentaerythritol, sorbitol with unsaturated polyesters of aliphatic diols and polyols and also maleic acid, fumaric acid and/or itaconic acid.

Rubber mixtures according to the present invention may also contain vulcanization accelerators. Examples of suitable vulcanization accelerators are e.g. mercaptobenzthiazoles and -sulfenamides, guanidines, thiurams, dithiocarbamates, thioureas, thiocarbonates and dithiophosphates. The vulcanization accelerators, sulfur and sulfur donors or peroxides or other cross-linking agents such as, for example, dimeric 2,4-toluylidene diisocyanate (=Desmodur®TT) or 1,4-bis-1-ethoxyhydroquinone (=crosslinker 30/10) are used in amounts of 0.1–40 parts by wt., preferably 0.1–10 parts by wt., with respect to the total amount of rubber.

Rubber mixtures according to the present invention are prepared by mixing the individual components in suitable equipment such as rollers, internal mixers or also mixer extruders. Preferred mixing temperatures are about 50–180° C.

The use of pre-produced mixtures of individual components e.g. in the form of master batches, is also possible. The preparation of gel/rubber master batches is performed, for example, in the latex state by mixing latices of the uncrosslinked rubbers and rubber gels. Isolation of the master batch components prepared in this way can be performed in the conventional way by evaporation, precipitation or freeze-coagulation. Suitable master batches and also rubber formulations according to the present invention can be obtained directly by mixing other components, such as fillers or phenol resins, into the latex mixture and then working this up.

Vulcanization of rubber mixtures according to the present invention is performed at temperatures of 100–250° C., preferably 130–180° C., optionally under a pressure of 10–200 bar.

The rubber mixtures are suitable in particular for producing industrial rubber articles and tire components. The following may be mentioned by way of example: roller coverings, coverings for conveyer belts, belts, spinnerets, seals, centres for golf balls, soles of shoes, beading mixtures, tire carcasses, subtread mixtures and tire sidewalls. The mixtures are particularly suitable for producing reinforced sidewalls for tires with emergency running properties ("inserts for run flat tires").

EXAMPLES

The rubber gel used for the trials is prepared in accordance with U.S. Pat. No. 5,395,891 by crosslinking polybutadiene latices by means of dicumyl peroxide. Characteristic data for the rubber gel are summarized in the table below:

| Gel | Gel type | DCP amount [phr] | Diameter of latex particles $d_{50}$ [nm] | Density of latex particles [g/cm$^3$] | Gel content [%] | Ql [%] | Tg [° C.] |
|---|---|---|---|---|---|---|---|
| A | BR | 1.0 | 116 | 0.9349 | 97 | 7.4 | −66.5 |

Compound Production, Vulcanization and Results

The following mixtures were prepared and the properties of the corresponding vulcanizates were determined. It is shown that the product of the modulus at 100% extension and the elongation at break ($S_{100} \times D$) and also the tear strength are improved by adding zinc peroxide. The mixing viscosity is not significantly worsened by adding zinc peroxide.

| Mixture no: | 1 | 2 | 3 | 4 | 5 |
|---|---|---|---|---|---|
| Natural rubber[1] | 100 | 100 | 100 | 100 | 100 |
| Gel A | 60 | 60 | 60 | 60 | 60 |
| Carbon black N 330 | 2 | 2 | 2 | 2 | 2 |
| Koresin[2] | 4 | 4 | 4 | 4 | 4 |
| Rhenopol L[3] | 4 | 4 | 4 | 4 | 4 |
| Zinc oxide | 5 | 0 | 0 | 0 | 0 |
| Stearic acid | 2 | 2 | 2 | 2 | 2 |
| TMQ[4] | 1.5 | 1.5 | 1.5 | 1.5 | 1.5 |
| 6PPD[5] | 2.5 | 2.5 | 2.5 | 2.5 | 2.5 |
| Sulfur | 5 | 2.5 | 2.5 | 2.5 | 1.5 |
| CBS[6] | 2 | 2 | 2 | 1 | 1.8 |
| Zinc peroxide[7] (ca. 55%) | 0 | 9.1 | 18.2 | 9.1 | 18.2 |

[1]= SMR 5 (Standard Malaysian Rubber)
[2]= condensation product of t-butylphenol and acetylene
[3]= plasticizer based on mineral oil
[4]= 2,2,4-trimethyl-1,2-dihydroquinoline (Vulkanox ® HS from Bayer AG)
[5]= N-1,3-dimethylbutyl-N'-phenyl-p-phenylenediamine (Vulkanox ® 4020 NA from Bayer AG)
[6]= N-cyclohexyl-2-benzthiazylsulfenamide (Vulkacit ® CZ from Bayer AG)
[7]= zinc peroxide, about 55%, from Riedel-de Haen (also contains zinc carbonate, zinc oxide and zinc hydroxide)

To characterize the properties of the uncrosslinked compounds, the following quantities were determined: Mooney viscosity ML 1+4 (100° C.), Mooney relaxation MR 30 and Mooney scorch at (130° C.).

| Mixture no: | 1 | 2 | 3 | 4 | 5 |
|---|---|---|---|---|---|
| ML 1 + 4 (100° C.) [ME] | 23.0 | 25.7 | 26.8 | 28.2 | 26.0 |
| MR 30 [%] | 1.3 | 1.9 | 3.4 | 3.5 | 3.5 |
| MS (130° C.) | 30.0 | 31.0 | | | |

The vulcanization behavior of the mixtures is tested in a rheometer at 160° C. in accordance with DIN 53 529 with the aid of a Monsanto rheometer MDR 2000 E. Characteristic data such as $F_a$, $F_{max}$, $t_{50}$ and $t_{90}$ were determined in this way.

These are defined, according to DIN 53 529, part 3, as follows:

| Mixture no: | 1 | 2 | 3 | 4 | 5 |
|---|---|---|---|---|---|
| $F_a$ [dNM] | 0.9 | 0.9 | 1.0 | 1.0 | 0.9 |
| $t_{50}$ [min.] | 4.2 | 5.6 | 6.0 | 6.2 | 6.4 |
| $t_{90}$ [min.] | 6.1 | 8.8 | 9.3 | 9.5 | 9.8 |
| $F_{max}$ [dNM] | 17.4 | 15.5 | 15.8 | 12.8 | 12.3 |

$F_a$: vulcameter reading at minimum of crosslinking isotherm
$F_{max}$: maximum vulcameter reading
$t_{50}$: time at which 50% conversion is achieved
$t_{90}$: time at which 90% conversion is achieved On the basis of the compounds mentioned above, the following test results are obtained after 15 min vulcanization time at 165° C.:

| Mixture no: ° | 1 | 2 | 3 | 4 | 5 |
|---|---|---|---|---|---|
| Tensile strength [Mpa] | 8.8 | 11.9 | 9.8 | 17.5 | 17.0 |
| Elongation at break [%] | 255 | 285 | 260 | 425 | 430 |
| Modulus at 50% extension [Mpa] | 1.0 | 1.0 | 1.1 | 0.9 | 0.8 |
| Modulus at 100% extension [Mpa] | 2.0 | 1.9 | 2.0 | 1.5 | 1.4 |
| Modulus at 300% extension [Mpa] | — | — | — | 8.7 | 8.3 |
| Shore A hardness, 23° C. | 57 | 57 | 59 | 53 | 53 |
| Shore A hardness, 70° C. | 57 | 57 | 58 | 53 | 52 |
| Rebound resilience, 23° C. [%] | 67 | 70 | 67 | 63 | 63 |
| Rebound resilience, 70° C. [%] | 83 | 81 | 75 | 72 | 72 |
| Goodrich flexometer Δ T [° C.] | 3.8 | 2.6 | 2.6 | 7.5 | 5.7 |
| Goodrich flexometer T [° C.] | 102.3 | 101.0 | 103.6 | 108.8 | 108.2 |
| Tan δ/60° C. | — | — | 0.021 | 0.032 | 0.0 |
| $S_{100} \times D$ | 510 | 542 | 520 | 638 | 602 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixtures comprising at least one double bond-containing rubber (A), at least one rubber gel (B) and at least one metal peroxide (C), wherein said double bond-containing rubber (A) is present in amounts of 100 parts by wt., said rubber gel (B) is present in amounts of 10 to 150 parts by wt. and said peroxide (C) is present in amounts of 0.1 to 30 parts by wt.

2. Rubber mixtures according to claim 1, wherein the double bond-containing rubbers (A) are NR, BR, SBR or SIBR.

3. Rubber mixtures according to claim 1, wherein the rubber gels (B), are based on BR, NR, SBR, NBR or CR.

4. Rubber mixtures according to claim 1, wherein said peroxide (C) is sodium peroxide, calcium peroxide, barium peroxide or zinc peroxide.

5. Rubber mixtures according to claim 1, wherein said peroxides (C) are used in the desensitized form.

6. Industrial rubber articles comprising rubber mixtures comprising at least one double bond-containing rubber (A), at least one rubber gel (B) and at least one metal peroxide (C), wherein said double bond-containing rubber (A) is present in amounts of 100 parts by wt., said rubber gel (B) is present in amounts of 10 to 150 parts by wt. and said peroxide (C) is present in amounts of 0.1 to 30 parts by wt.

7. Industrial rubber articles according to claim 6, wherein the double bond-containing rubbers (A) are NR, BR, SBR or SIBR.

8. Industrial rubber articles according to claim 6, wherein the rubber gels (B), are based on BR, NR, SBR, NBR or CR.

9. Industrial rubber articles according to claim 6, wherein said peroxide (C) is sodium peroxide, calcium peroxide, barium peroxide or zinc peroxide.

10. Industrial rubber articles according to claim 6, wherein said peroxides (C) are used in the desensitized form.

* * * * *